United States Patent Office 3,119,813
Patented Jan. 28, 1964

3,119,813
AZETIDINE DERIVATIVES
William Taub, Rehovoth, Israel, assignor to Calanda-Stiftung, Institut für wissenschaftliche und technische Forschung, Vaduz, Liechtenstein
No Drawing. Filed May 9, 1961, Ser. No. 108,725
Claims priority, application Switzerland May 10, 1960
7 Claims. (Cl. 260—239)

The present invention concerns a process for the production of new azetidine derivatives as well as the compounds obtained by this new process which have valuable pharmacological properties.

4,4-disubstituted azetidine-2-ones of the general formula

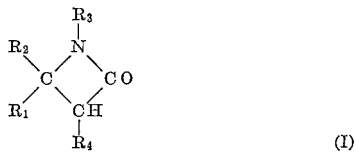

(I)

wherein:

$R_1$ represents a hydrocarbon radical which can be substituted in any aromatic nucleus present by halogen and/or alkoxy, $R_2$ represents a cycloalkyl radical or an aryl or aralkyl radical possibly substituted by halogen or alkoxy, $R_3$ represents hydrogen, a low alkyl or alkenyl radical, and $R_4$ represents hydrogen or a low alkyl radical, have not been known up to now. Azetidine-2-ones disubstituted solely in the 4-position have not been described up to now. The possible reason for this is that the $\beta$-aminopropionic acid derivatives necessary for the production thereof have not been known. However, in the degradation according to Hofmann of $\alpha,\alpha$-disubstituted succine-$\alpha$-amide acid derivatives there is a method which can be used for the synthesis of such $\beta$-aminopropionic acid derivatives, which compounds, surprisingly, are very stable. It has now been found that the compounds of the general Formula I defined have sedative, central depressant and strongly anti-convulsive activity. Thus, they can be used as central depressants, sedatives and soporifics and are administered perorally in the form of tablets, coated tablets or capsules.

According to the invention, the new azetidine derivatives of the general Formula I are produced by subjecting $\beta$-aminocarboxylic acids of the general formula

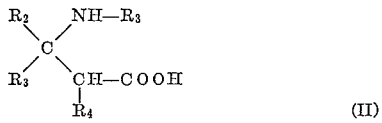

(II)

or reactive functional derivatives thereof to ring closing conditions in the presence or absence of solvents and, if desired, treating the compounds obtained of the general Formula I, provided that $R_3$ therein is hydrogen, with reactive esters of alcohols of the general formula $$R_3'—OH \qquad (III)$$

wherein:

$R_3'$ represents a radical corresponding to the definition of $R_3$ with the exception of hydrogen, this treatment being performed in the presence of acid binding agents. An advantageous method of performing the process according to the invention consists in treating an ester, in particular a low alkyl ester, of a $\beta$-aminocarboxylic acid of the general Formula II with a low alkyl magnesium halide, e.g. methyl magnesium iodide or ethyl magnesium bromide, in diethyl ether or in another ether-like solvent suitable for metal organic reactions, and liberating the compound of the general Formula I from the reaction product so obtained, e.g. by decomposition with dilute aqueous mineral acid or aqueous ammonium chloride solution.

According to another method, a halide of a $\beta$-aminocarboxylic acid of the general Formula II or an acid addition salt thereof, in particular the hydrochloride of $\beta$-aminocarboxylic acid chloride obtained by treating the corresponding $\beta$-aminocarboxylic acid with thionyl chloride, with a tertiary organic base such as, e.g. dimethyl aniline or triethylamine. An inert organic solvent such as, e.g. benzene, or an excess of the tertiary organic base used can serve as solvent for this ring closure.

In a third modification of the process according to the invention, an N-alkanoyl derivative is used as reactive functional derivative of a $\beta$-aminocarboxylic acid of the general Formula II. To close the ring, it is heated, for example, to temperatures between 150 and 200° C., the pressure possibly being so reduced that the alkanoic acid liberated is distilled off without hindrance. The N-isobutyryl derivatives, for example, can be used as N-alkanoyl derivatives of $\beta$-aminocarboxylic acids.

Finally, the free $\beta$-aminocarboxylic acids of the general Formula II are also converted into azetidine derivatives of the general Formula I by treating them with an agent which takes up water, in particular with phosphorus trichloride or an N,N'-disubstituted carbo-di-imide such as N,N'-dicyclohexyl carbo-di-imide. In the former case, for example, the starting material is boiled with excess phosphorus trichloride in the presence of absence of an organic solvent for some time, for example for 1–3 hours, under reflux.

On using N,N'-dicyclohexyl carbo-di-imide, the ring can be closed, for example, in dioxan or in aqueous dioxan at room temperature or at a slightly raised temperature.

The compounds of the general Formula I obtained by one of the above modifications of the process in which $R_3$ is hydrogen, can be converted into 1,4,4-trisubstituted azetidine-2-ones of the general Formula I, for example, by treatment with a low alkyl halide such as methyl iodide, ethyl bromide, ethyl iodide or a dialkyl sulphate, in the presence of e.g. sodium hydride as acid binding agent.

In the compounds of general Formula I, $R_1$ and $R_2$ independently of each other represent, for example, methyl, ethyl, propyl, isopropyl, n-butyl, isobutyl, cyclopropyl, cyclopentyl, cyclohexyl, phenyl, 4-chlorophenyl, 4-bromophenyl, 4-methoxyphenyl, 4-ethoxyphenyl, benzyl, 4-methylbenzyl, 4-chlorobenzyl, 3,4-dimethoxybenzyl or $\beta$-phenylethyl radicals, and $R_3$ is hydrogen or the methyl, ethyl, n-propyl, n-butyl, isobutyl, allyl or methallyl radical.

The following examples further illustrate the production of the new azetidine derivatives according to the invention without limiting it in any way. Parts are given therein as parts by weight, preferably in grammes. The relationship of parts by weight to parts by volume is as that of grammes to cubic centimetres. The temperatures are in degrees centigrade.

*Example 1*

57.9 parts (0.3 mol) of $\beta$-phenyl-$\beta$-methyl-$\beta$-aminopropionic acid methyl ester are added dropwise within 30 minutes and while stirring well to the ethereal solution of about 0.6 mol of ethyl magnesium bromide, produced from 15 parts of magnesium filings, 80 parts by volume of ethyl bromide and 1500 parts by volume of anhydrous diethyl ether. During the addition, the temperature of the reaction liquid is kept at about 5° by exterior cooling. On completion of the addition of the ester, stirring is continued for 2–3 hours at room temperature. A 10% aqueous ammonium chloride solution is then added while still stirring to decompose the reaction product and the whole is still stirred until there are two clear phases. The aqueous phase is extracted twice with ether and the ether extracts are combined with the original ethereal phase. The combined ether solutions are washed with water and dried over sodium sulphate. After evaporating off the solvent, an oily residue remains which solidifies on rubbing with a little petroleum ether. After dissolving and recrystallising from benzene/petroleum ether, 4-phenyl-4-methyl-azetidene-2-one is obtained; it is in the form of colourless crystals which melt at 78–79°.

*Example 2*

The solution of 20.7 parts (=0.1 mol) of β-phenyl-β-ethyl-β-aminopropionic acid methyl ester (B.P.$_2$ 110–116°) are added dropwise within 45 minutes while stirring well to the ethereal solution of methyl magnesium iodide, produced from 7.5 parts of magnesium filings and 43 parts of methyl iodide in 200 parts by volume of anhydrous ether, the temperature being kept between 5 and 10° by exterior cooling. On completion of the dropwise addition, the reaction mixture is refluxed for 2 hours. After cooling to about 0°, 70 parts by volume of a 5% ammonium chloride solution are slowly added dropwise and the reaction liquid is stirred for another 20 minutes at room temperature. The aqueous phase is extracted twice with ether and the ether extracts are combined with the original ether phase. After washing with 10% sodium bisulphite solution, dilute hydrochloric acid and, finally, with water, the ethereal solution is dried over sodium sulphate. On evaporating off the solvent, an oily residue remains which solidifies into a crystal mass after some time. After dissolving and recrystallising from a mixture of benzene and petroleum ether, 4-phenyl-4-ethyl-azetidine-2-one is obtained in the form of colourless crystals which melt at 97°.

*Example 3*

22.7 parts (=0.1 mol) of β-(p-chlorophenyl)-β-ethyl-β-amino-propionic acid are digested with 50 parts by volume of thionyl chloride. On completion of the reaction, the excess thionyl chloride is removed in vacuo and the crude β-(p-chlorophenyl)-β-ethyl-β-amino-propionic acid chloride-hydrochloride is suspended in 400 parts by volume of anhydrous benzene. The suspension is added in small portions to the boiling solution of 38.2 parts (=0.3 mol) of dimethyl aniline in 400 parts by volume of benzene. After boiling under reflux for 4 hours, it is cooled and the dimethyl aniline hydrochloride formed is extracted with water. The excess dimethyl aniline is removed from the benzene phase by washing out with dilute hydrochloric acid, the benzene phase is again washed with water and dried over anhydrous magnesium sulphate. After removing the solvent under reduced pressure, an oily residue remains which soon solidifies into a brown-coloured crystal mass. After dissolving and recrystallising twice from a mixture of benzene and petroleum ether, 4-(p-chlorophenyl)-4-ethyl-azetidine-2-one is obtained in the form of colourless, firm, long needles which melt at 96°.

*Example 4*

The solution of 23.7 parts (0.1 mol) of β-(p-methoxyphenyl)-β-ethyl-β-amino-propionic acid methyl ester (B.P.$_1$: 142–150°) in 100 parts by volume of anhydrous ether is added dropwise while stirring well at about 5° to an ethereal solution of methyl magnesium iodide, produced from 7.5 parts of magnesium and 43 parts of methyl iodide in 200 parts by volume of anhydrous ether. On completion of the addition of the ester, the reaction mixture is refluxed for 3 hours and then cooled. The solution of 10 parts of ammonium chloride in 100 parts of water is then added at 0° while stirring vigorously and the whole is stirred at room temperature for another 15 minutes. The aqueous phase is extracted twice with ether, the ether extracts are combined with the ether phase which is washed first with a 10% sodium bisulphite solution, then with dilute hydrochloric acid and finally with water. After drying over sodium sulphate, the ether is evaporated off. The oily residue solidifies into a yellowish crystal mass on rubbing with petroleum ether. After dissolving and recrystallising from dilute methanol, 4-p-methoxyphenyl-4-ethyl-azetidine-2-one is obtained in the form of colourless crystals which melt at 104°.

The following compounds, for example, can be produced in an analogous manner:

4-phenyl-4-isopropyl-azetidine-2-one, M.P. 113–113.5°,
4-phenyl-4-n-butyl-azetidine-2-one, M.P. 119–119.5°,
4-phenyl-4-isoamyl-azetidine-2-one, M.P. 87–88.5°,
4-p-chlorophenyl-4-n-butyl-azetidine-2-one, M.P. 101–102°,
4-phenyl-4-allyl-azetidine-2-one, M.P. 76.5–77°,
4-(3′,4′-dimethylphenyl)-4-ethyl-azetidine-2-one,
4-p-chlorophenyl-4-methyl-azetidine-2-one, M.P. 71–72°,
4-phenyl-4-cyclopropyl-azetidine-2-one, M.P. 115°,
4-phenyl-4-cyclohexyl-azetidine-2-one, M.P. 158–159°,
4-phenyl-4-benzyl-azetidine-2-one, M.P. 125–125.5°,
4-cyclohexyl-4-methyl-azetidine-2-one, M.P. 65–66°,
4,4-diphenyl-azetidine-2-one,
3-methyl-4-phenyl-4-methyl-azetidine-2-one, B.P.$_{1.3}$ 185°.

*Example 5*

3 parts (0.13 mol) of sodium hydride are added in several portions while stirring at room temperature to 18.7 parts (0.1 mol) of 4-phenyl-4-allyl-azetidine-2-one dissolved in 400 parts by volume of toluene. The mixture is heated under reflux for 25 hours, then cooled with ice water, 17.8 parts of n-butyl bromide are added dropwise while still stirring and the whole is stirred under reflux for another hour. 100 parts by volume of dimethylformamide are then added and the mixture is again stirred under reflux. After cooling, any excess sodium hydride is removed, the toluene phase is washed three times with water, dried over sodium sulphate and distilled under reduced pressure. 1-n-butyl-4-phenyl-4-allyl-azetidine-2-one is obtained as a colourless oil which boils at 137–138° under 0.7 mm.

1-methyl-4-phenyl-4-ethyl-azetidine-2-one is obtained in an analogous manner.

*Example 6*

19.55 parts (0.1 mol) of 4-(p-chlorophenyl)-4-methyl-azetidine-2-one are dissolved in 380 parts by volume of anhydrous toluene and 3 parts (0.13 mol) of sodium hydride are added while stirring. After refluxing for 2 hours and then cooling to room temperature, 15.7 parts of allyl bromide are added dropwise while stirring and the mixture is again refluxed for 1 hour. 100 parts by volume of dimethyl formamide are then added and the whole is refluxed for another hour. After cooling, non-reacted sodium hydride is removed and the toluene phase is washed three times with water, dried over sodium sulphate and, after removal of the solvent, distilled under reduced pressure. 1-allyl-4-(p-chlorophenyl)-4-methyl-azetidine-2-one is obtained as a colourless oil which boils at 127–129° under 0.3 mm.

What I claim is:

1. A 4,4-disubstituted azetidine-2-one of the formula

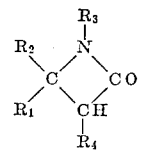

wherein:

$R_1$ is a member selected from the group consisting of lower alkyl, allyl, cyclopropyl, phenyl and benzyl,
$R_2$ is a member selected from the group consisting of phenyl, p-chlorophenyl, p-methoxyphenyl, dimethylphenyl and cyclohexyl, $R_3$ is a member selected from the group consisting of hydrogen, lower alkyl and allyl, and
$R_4$ is a member selcted from the group consisting of hydrogen and methyl.
2. 4-phenyl-4-methyl-azetidine-2-one.
3. 4-phenyl-4-ethyl-azetidine-2-one.
4. 4-(p-chlorophenyl)-4-ethyl-azetidine-2-one.
5. 4-(p-methoxyphenyl)-4-ethyl-aztidine-2-one.
6. 4-phenyl-4-benzyl-azetidine-2-one.
7. 4-cyclohexyl-4-methyl-azetidine-2-one.

References Cited in the file of this patent

FOREIGN PATENTS

| | | |
|---|---|---|
| 829,663 | Great Britain | Mar. 2, 1960 |
| 1,245,381 | France | Sept. 26, 1960 |

OTHER REFERENCES

Testa et al.: Liebig's Annalen, vol. 614, pp. 158–66 (1958).

Rosenthal et al.: Jour. Org. Chem., vol. 23, pp. 1037–9 (1958).

Chemical Abstracts, vol. 53, p. 20553 (1959), abstracting Maffii, Farmaco, Ed. Sci., vol. 14, pp. 176–93 (1959).